United States Patent [19]

Kasiewicz

[11] 4,453,517

[45] Jun. 12, 1984

[54] CONTROL CIRCUIT FOR ROAD AND ENGINE SPEED GOVERNOR

[76] Inventor: Stanley J. Kasiewicz, 807 Harvest La., Bloomfield Hills, Mich. 48013

[21] Appl. No.: 459,346

[22] Filed: Jan. 20, 1983

[51] Int. Cl.³ ............ F02D 9/00; F02D 1/08; G06G 7/70; B60K 31/00
[52] U.S. Cl. .................. 123/352; 123/351; 123/363; 180/176; 364/424
[58] Field of Search ............ 123/351, 352, 376, 340, 123/341, 320, 361, 396, 363; 180/108, 105, 107, 109, 110, 170, 179, 175, 282; 364/424, 426

[56] References Cited

U.S. PATENT DOCUMENTS

| | | | |
|---|---|---|---|
| 3,217,827 | 11/1965 | Pickles | 123/351 |
| 3,491,734 | 1/1970 | Mackowiak | 123/352 |
| 3,575,257 | 4/1971 | Woseikowski | 123/376 |
| 3,916,854 | 11/1975 | Barton et al. | 123/363 |
| 4,181,103 | 6/1980 | Sturdy | 123/320 |
| 4,359,125 | 11/1982 | Shinuda et al. | 123/352 |
| 4,362,138 | 12/1982 | Krueger et al. | 123/352 |
| 4,419,729 | 12/1983 | Krieder | 123/352 |

*Primary Examiner*—Raymond A. Nelli

*Attorney, Agent, or Firm*—Reising, Ethington, Barnard, Perry & Milton

[57] ABSTRACT

An electronic control circuit is disclosed for an engine and load speed governor of the type comprising an overriding throttle closing device. The control circuit comprises engine speed signal generating circuit and a load speed generating circuit to provide electrical speed signals to the input of a microprocessor. The microprocessor develops motor control signals for a reversible electric motor which drives the actuator for the throttle limiting device. The motor control signals for operation in the close throttle direction and the open throttle direction are developed at different outputs of the microprocessor and applied to respective inputs of a motor driver circuit. The motor control signals produced by the microprocessor are time modulated, either pulse rate or pulse width, in accordance with the operating conditions of the engine or load to provide operation of the motor at precisely controlled slow speeds. Unmodulated motor control signals are also produced by the microprocessor under certain operating conditions to provide operation of the motor at full speed.

10 Claims, 17 Drawing Figures

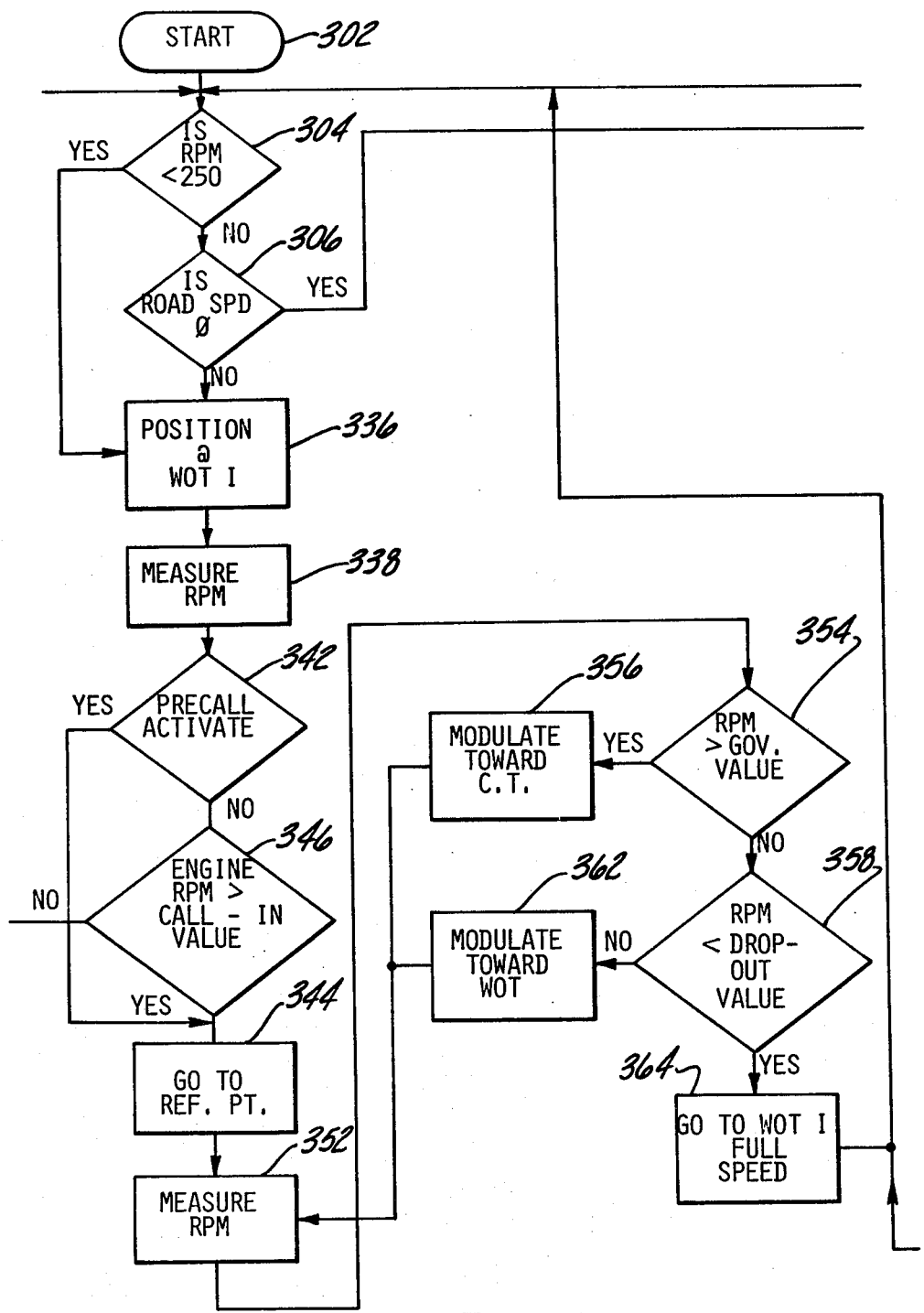

CONTROL CIRCUIT FOR ROAD AND ENGINE SPEED GOVERNOR

FIELD OF THE INVENTION

This invention relates to engine and load speed governors; more particularly, it relates such governors with an overriding throttle closing means for limiting the flow of energy supplying means to the engine. It is especially well adapted for use on motor vehicles.

BACKGROUND OF THE INVENTION

In many types of motor vehicles it is desirable to provide speed governing to ensure that the road speed does not go above a predetermined limit and that the engine speed is allowed to make only brief excursions above its predetermined limit. The governing system should not unnecessarily restrict either the engine speed or the vehicle speed. Governing systems of this type are known to improve the economy of vehicle operation by reducing fuel comsumption and engine maintenance costs and increased operating life. Further, such systems afford the vehicle driver the convenience of operating the vehicle with a fully depressed throttle to maintain a cruising speed.

It is also desirable to provide an engine and load speed governor which can be installed as an add-on unit either in the factory or in the field without the cost and inconvenience of replacing or modifying the carburetor, ignition system and speedometer cable of the vehicle.

Engine and load speed governors of this general type are known in the prior art. The Sturdy U.S. Pat. No. 4,181,103 discloses a governor of this type which is characterized as a dynamically-surging governor which allows engine speed to oscillate rapidly about its predetermined limit when the vehicle is operated in a lower gear ratio. In the governor of this patent, the throttle limit is driven over a wide range between wide open and the fully closed positions when a predetermined speed is reached.

The governor disclosed in my co-pending application Ser. No. 168,566 allows the engine to be accelerated to its predetermined limit with small overshoot and then it regulates the speed in close approximation to the predetermined speed limit. In this governor, the engine throttle limit is positioned at a reference position, between wide open and close throttle position, when the engine reaches a predetermined speed. In this system, the overriding throttle closing means moves at the relatively fast rate during movement outside a reference zone and at a relatively slow rate within the reference zone.

Electronic control circuits especially adapted for use with governors of the type are disclosed in Kasiewicz U.S. Pat. Nos. 4,090,480, 4,257,136 and Ser. No. 167,964.

SUMMARY OF THE INVENTION

This invention provides an electronic control circuit for an engine and load speed governor of the type in which an overriding throttle limiting means is positioned by the governor to limit engine speed and load speed to predetermined governed values. In accordance with this invention, an overriding throttle limiting means is positioned by an actuator driven by a reversible electric motor at precisely controlled motor speeds in response to electrical engine speed and load speed signals. This is accomplished by a microprocessor with an engine speed signal generator and a load speed signal generator and providing output motor control signals to a motor driver circuit with a reversible electric motor. A microprocessor produces a wide open throttle motor control signal and a close throttle motor control signal with the control signals being time modulated, either pulse rate or pulse width, for slow speed operation of the motor and being unmodulated for full speed operation of the motor.

Further, according to this invention, when either the engine speed or the load speed exceeds a respective call-in value, which is lower than the governed value, the microprocessor produces the full speed motor control signal to drive the actuator for the throttle limiting means at full speed to a reference position between the wide open throttle position and the close throttle position to place the governor in the reference position governing mode. In this mode, the microprocessor produces motor control signals for slow speed motor operation. When the engine is running in an unloaded condition, the microprocessor produces motor control signals which are modulated at a rate to produce a neutral mode slow speed. When the engine is running in loaded condition with engine speed governing, the microprocessor produces motor control signals modulated at a rate for producing an engine governing mode slow speed. When the engine is running in a loaded condition and is operated with load speed governing, the microprocessor produces motor control signals which are time modulated at a plurality of different rates to produce motor operation at a plurality of different slow speed values.

Further, according to this invention, the microprocessor, in response to engine running with the load at standstill, produces a full speed motor control signal to drive the actuator to an intermediate position between the wide open throttle position and the reference position.

Further, according to this invention, the reversible electric motor is energized from a voltage source having a voltage which is substantially greater, about 1.5 times, the rated voltage of the motor to obtain high speed operation in an unmodulated DC voltage applied to the motor for full speed.

Further, according to this invention, the engine speed signal and the load speed signal are both applied to a single interrupt input of the microprocessor and one of the signals is applied to another input to distinguish the signals at the interrupt input from each other on the basis of time coincidence.

Further, according to this invention, the microprocessor produces a wide open throttle signal and a close throttle signal on first and second outputs and the respective signals are applied through a respective logic gate to the first and second inputs on a motor driver circuit or reversible energization of the motor at controlled speeds. The logic gates are cross coupled to prevent the signals at the respective inputs of the motor driver circuit from being in the same logic state at the same time.

Further, according to this invention, the speed signals are developed by pulse counting of a significant number of pulses in relation to the speed being measured.

Further, according to this invention, the microprocessor is provided with a stored operating program which is useful for any combination of engine and load, for example, any vehicle, and is provided with field programmable input pins to program the microprocessor for a particular engine and load with which the governor is to be used.

A more complete understanding of this invention may be obtained from the detailed description that follows taken with the accompanying drawings.

DESCRIPTION OF THE DRAWINGS

FIGS. 8, 8A, 8B, 9, 10, 11 and 12, collectively show a flow chart representing the program of the microprocessor in the governor.

BEST MODE FOR CARRYING OUT THE INVENTION

Figure 1:
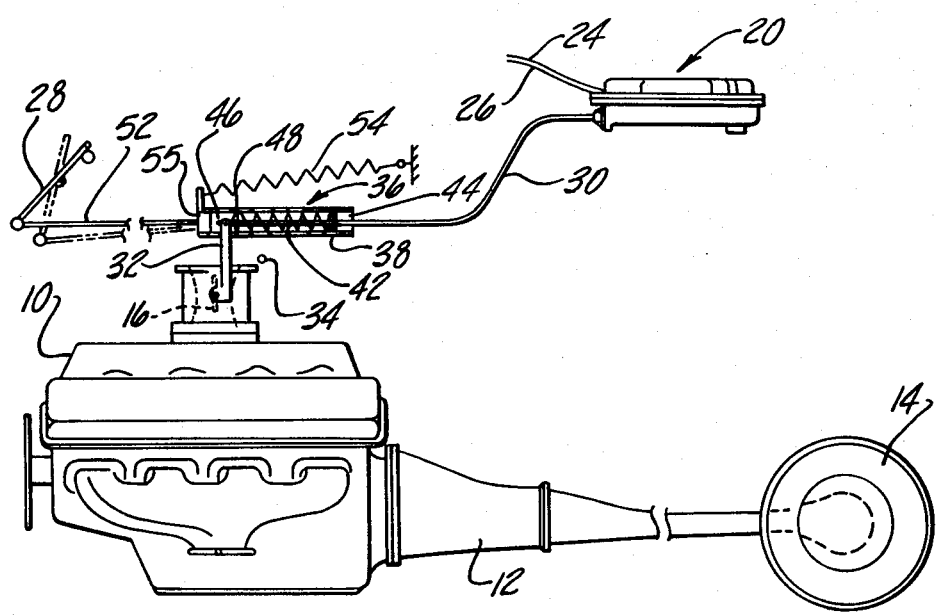
FIG. 1 shows the governor of this invention in a vehicle installation.

Referring now to the drawings, there is shown an illustrative embodiment of the invention in an engine speed and load speed governor especially adapted for motor vehicles. As used herein, the term load or load speed refers to the load which is driven by the engine; in the case of a motor vehicle the load speed is the same as the road speed. It will be appreciated, as the description proceeds, that the governor of this invention is useful in applications other than motor vehicles and may be implemented in forms different from the illustrative embodiment.

Referring now to FIG. 1, the governor of this invention as depicted in a typical vehicle installation. In such a vehicle installation, the governor is adapted to limit the road speed to a prescribed safe speed such as 55 miles per hour. A governor is also adapted to limit the engine speed so that it does not exceed a maximum safe speed, such as 4300 RPM, except for brief excursions.

In FIG. 1, a truck is represented by an internal combustion engine 10 which is connected through a power transmission 12 with the drive wheels 14. The engine is provided with a carburetor, including a throttle plate 16, for regulating the flow of fuel to the engine. The transmission provides different ratios of speeds between the engine and the drive wheels. Typically, with a manual transmission in a truck, the transmission is shifted into low gear to start the vehicle at low speeds from a standing start. In the low gear, the engine can operate at high speed and the gear reduction of the transmission supplies a very high torque to the drive wheels to accelerate the vehicle. As the vehicle speed increases, the transmission should be shifted to a higher gear ratio before the engine reaches its safe limiting speed. When the shift occurs, a lower engine speed will maintain the same vehicle speed and the engine speed and road speed are gradually increased until the engine speed again approaches the limiting value. This process of accelerating the engine and then upshifting the transmission is continued until the transmission is in high gear and the truck is running at a desired road speed.

It will be appreciated that in the normal operation of a vehicle, engine overspeeding tends to occur while operating in the lower gear ratios of the transmission. Also, the engine is especially susceptible to overspeeding when the transmission is in neutral so that the engine is unloaded. Vehicle overspeeding tends to occur when the transmission is in high gear. Thus, the governor must selectively respond to both engine speed and road speed to maintain each of them within safe limits at all times.

Referring further to FIG. 1, the governor 20 of this invention receives engine speed and road speed information and imposes a limit on the throttle opening of the engine to limit the engine speed and road speed to respective governed values. The governor has an electrical input 24 connected with an engine speed signal generator, which is coupled with the ignition coil in a spark ignited engine, to derive an engine speed signal. It also has an electrical input 26 connected with a road speed signal generator which is driven by the output shaft of the transmission to produce a road speed signal. The governor is mechanically connected by a cable 30 with the throttle plate 16 of the engine carburetor to limit the opening of the throttle. The primary control of throttle plate movement remains under the control of the driver by the accelerator pedal 28. A throttle arm 32 is connected with the throttle plate 16 for angular movement thereof about the throttle plate shaft. With the throttle plate in the idle position, the throttle arm 32 engages an idle stop 34. In order to limit the movement of the throttle arm 32 by the accelerator pedal, an override device 36 is provided. It is a lost motion device which comprises a tubular body 38 containing a spring 42 seated against the end 44 of the body. The cable 30 is connected with the other end of the spring 42 and the cable sheath is connected with the end 44 of the body. The throttle arm 32 is connected by a ball stud 46 with the cable end 48. The accelerator pedal 28 is connected by a linkage rod 52 with the other end 44 of the body. An idle return spring 54 acting on the body 38 biases the accelerator pedal 28 and the throttle plate 16 toward the idle positions.

The accelerator pedal, as shown in FIG. 1, is in the wide open or full throttle position, i.e. it is fully depressed by the driver of the truck against the pedal stop. The cable 30 is in an extended or wide open throttle position and does not limit the movement of the throttle arm 32. When the accelerator pedal is depressed, the override device 36 is moved by the rod 52 and the throttle arm 32 moves with it toward the wide open throttle position and the idle spring is extended. When the pedal is released, the idle spring causes the throttle arm 32 to move to its idle position against the idle stop 34. The movement of the override device 36 is accommodated by the flexing of the sheath of the cable 30.

When the cable 30 is in a retracted position between wide open throttle and close throttle, the spring 42 is compressed between the cable end 48 and the end 44 of the body 38. The ball stud moves with the cable end and sufficient movement of the cable end will cause the throttle arm 32 to reach the idle stop 34, even though the pedal is held in its wide open position by the driver.

Thus, the accelerator pedal and the carburetor linkage will function as in a typical ungoverned carburetor so long as the cable end 48 is in its extended or wide open throttle position. This will occur at engine and road speeds below the governed speeds. However, when the cable 30 is retracted toward the close throttle position, the normal throttle control by actuation of the pedal 28 will be overridden and the movement of the throttle plate 16 will be limited in its open throttle direction according to the extent of movement of the cable end 48. Another form of override device is described in Sturdy U.S. Pat. No. 4,362,138 and may be used in place of override device 36.

Figure 2:
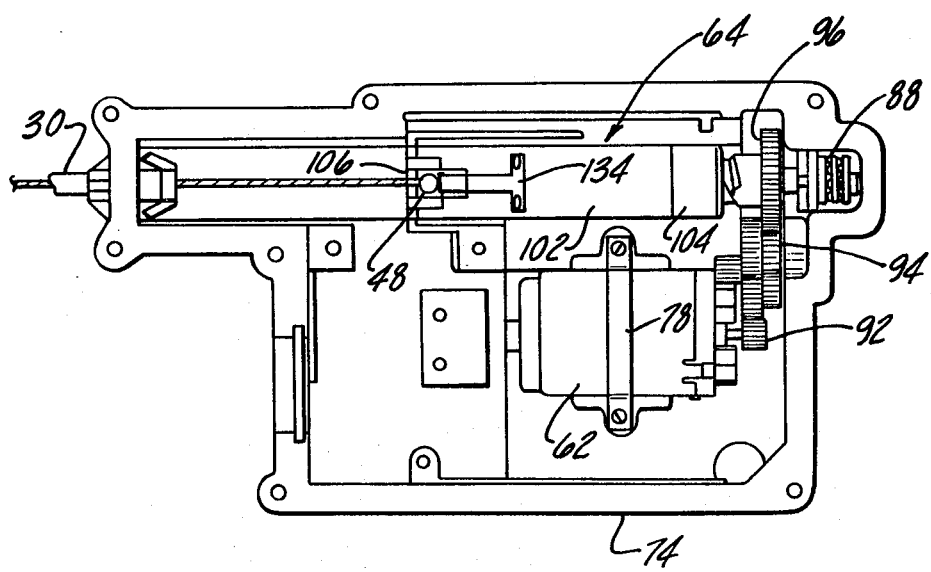
FIG. 2 shows a plan view of the governor with parts removed.
Figure 3:
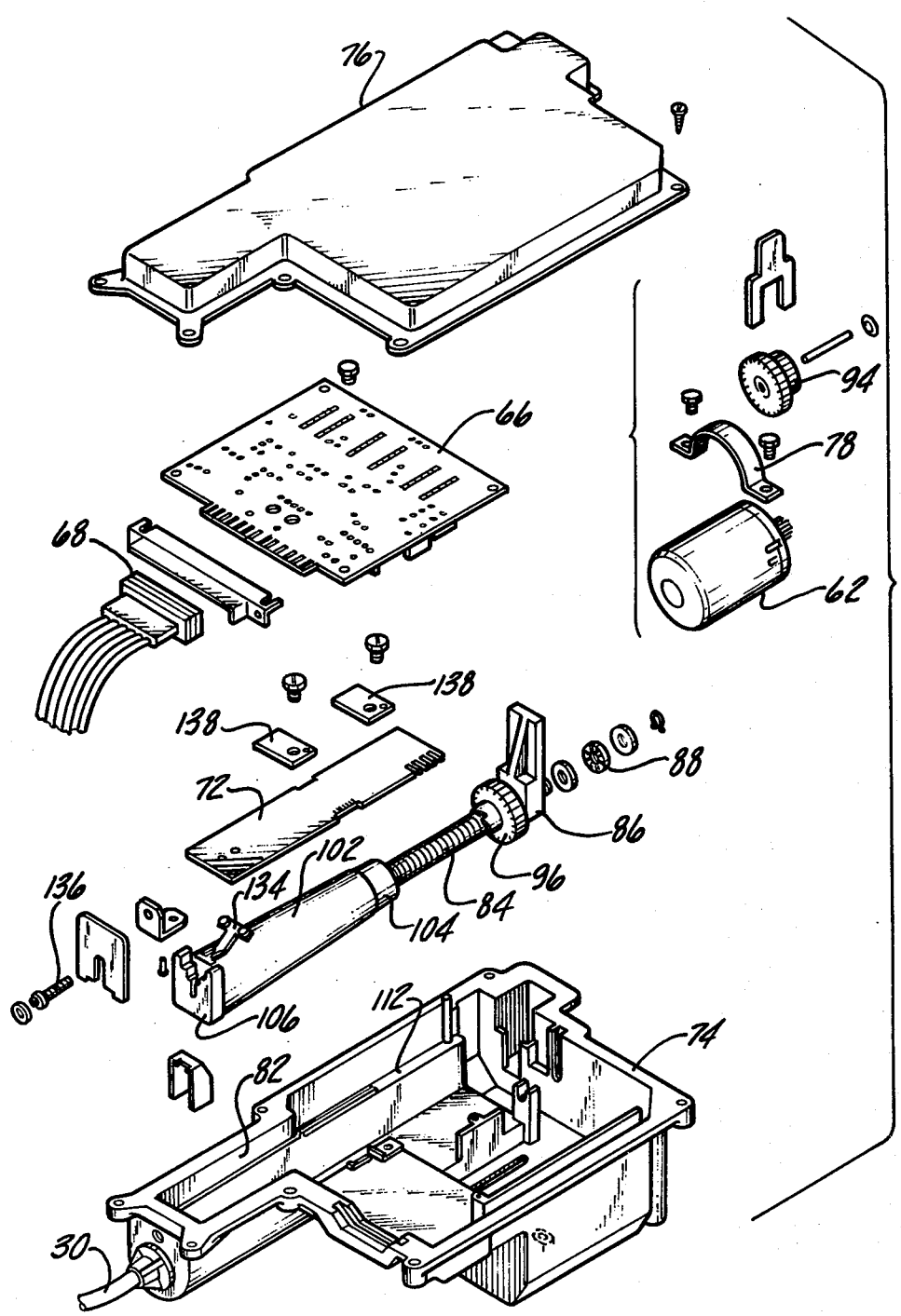
FIG. 3 is an exploded view of the governor.

The governor 20 is shown in detail in FIGS. 2 and 3. It comprises, in general, a reversible electrical motor 62 which is drivingly connected with a linear actuator 64 for displacing the cable 30. The governor also includes an electrical control circuit 66 which has input and output ports connected through a connector 68 to external points. A switch plate 72 coacts with the linear actuator and is electrically connected with the circuit 66.

In greater detail, the governor comprises a housing with a pan-shaped base 74 and a cover 76. The reversible electric motor 62 is a DC permanent magnet motor when is mounted on the base 74 and secured thereto by a retainer 78. The linear actuator 64 is disposed in an elongated channel 82 in the base 74. It comprises a lead screw 84 which is mounted for rotation in a main bearing 86 and is seated against a thrust bearing 88. The motor 62 is drivingly connected with the lead screw 84 through a gear train including a drive pinion 92 on the motor, jack shaft gears 94 and a drive and stop gear 96 on the lead screw. The jack shaft gears 94 are held in place by a jack shaft retainer 98.

The linear actuator 64 further comprises an actuator member 102 which is mounted on a lead screw by a drive nut 104 which is nonrotatively secured to the actuator member. The outer end of the actuator member is provided with a cable connector 106 which receives the cable end 48 of the cable 30. A bridging contact 134 is mounted on the actuator member 102 and coacts with the switch plate 72. In this arrangement, rotation of the motor 62 in a clockwise direction (viewed from the pinion gear end) causes the lead screw to rotate in the clockwise direction and advance the drive nut 104 and hence the actuator member 102 to the right (as viewed in FIG. 2), thus retracting the cable 30 into the housing. When the motor is rotated in the counterclockwise direction, the actuator member 102 is moved to the left (as viewed in FIG. 2) and the cable 30 is extended, i.e. pulled out of the housing by the spring 42 in the override device 36.

Figure 6:
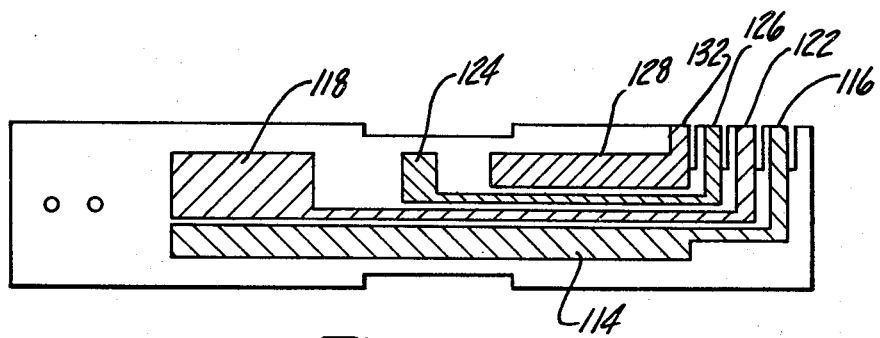
FIG. 6 shows a part of the governor.

The switch plate 72 as shown in FIGS. 3 and 6 is mounted on a shoulder 112 in the elongated channel 82 in the base 74. The switch plate 72 comprises a printed circuit board with a set of conductive paths adjacent the linear actuator 64. As shown in FIG. 6, the switch plate comprises an elongated ground contact 114 having a terminal 116. It also comprises a wide open throttle contact, herein called a wot-1 contact 118 having a terminal 122. The switch plate also includes an intermediate contact, herein called a wot-2 contact 124 having a terminal 126 and a reference contact 128 having a terminal 132. The bridging contact 134 is adapted to bridge between the ground contact 114 and the wot-1 contact 118, the wot-2 contact 124 and the reference contact 128 as the actuator member 102 is moved axially by the lead screw. The switch plate 72 may be adjustably positioned along the axis of the actuator member 102 by means of an adjusting screw 136 and secured in place by a pair of clamps 138. The adjustment of the switch plate permits an initial setting of the linear position of the reference contact 128 (and hence the wot-1 and wot-2 contacts) in relation to the throttle limit position established by the position of the actuator member 102. This permits calibration of the governor for a particular vehicle installation, as will be further understood from the description that follows.

Figure 4:
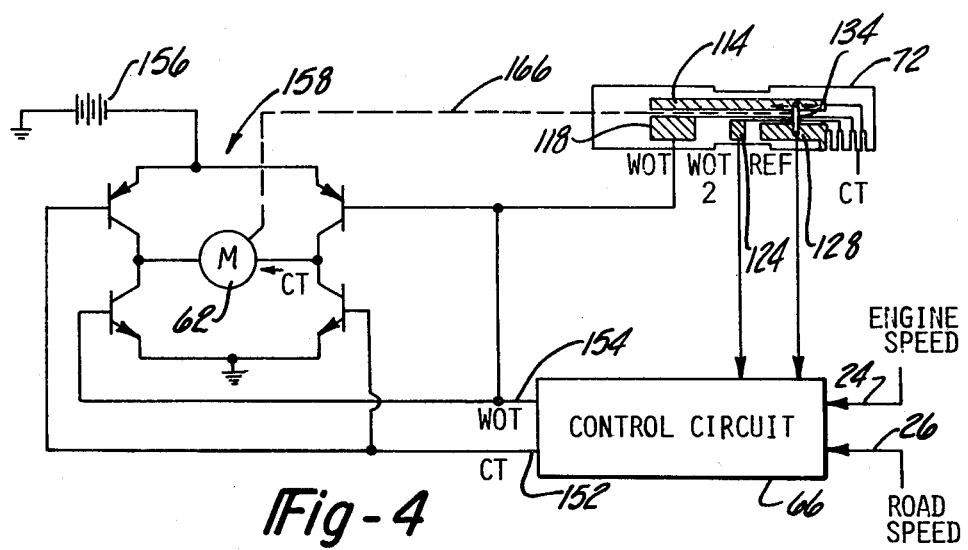
FIG. 4 is a schematic of the governor circuit.

The governor 20 is shown diagramatically in FIG. 4. The electronic control circuit 66 receives the engine speed signal at input port 24 and the road speed signal at input port 26. In response to the speed signals and other inputs to be described, the electronic control circuit 66 develops motor control signals for controlling the reversible motor 62. A close throttle motor control signal CT is developed at output port 152 and an open throttle control signal WOT is developed at output port 154. The motor 62 is energized from the vehicle battery 156 through a motor driver circuit 158. The close throttle signal CT and the open throttle control signal WOT are applied to the driver circuit 158. The bridging contact 134 (mounted on the actuator member 102) is shown in FIG. 4 as being connected with the motor 62 through a mechanical drive coupling 166. The actuator member 102 is, as previously described, connected through the cable 30 to the throttle arm 32. The bridging contact 134 is adapted to connect the reference contact 128 to the ground contact 114 or to connect the wot-2 contact 124 to the ground contact 114 or to connect the wot-1 contact 118 to the ground contact 114 depending upon the position of the actuator member 102. When the bridging contact 134 engages the reference contact 128, a reference position signal is supplied to an input port 168 on the control circuit 66. Similarly, when the bridging contact 134 engages the wot-2 contact 124, the wot-2 position signal is supplied to an input port 172 on the control circuit 66. When the bridging contact 134 engages the wot-1 contact 118 a wot-1 position signal is applied to the control circuit 66 by grounding the output port 154.

Figure 5:
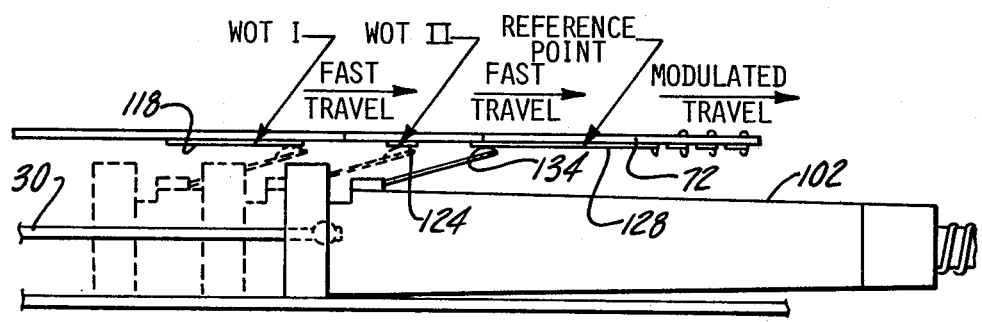
FIG. 5 shows a portion of the actuator in alternate positions.

It will be appreciated that the actuator member 102 is movable by the motor 62 over a range of movement extending between the CT (close throttle) position as indicated in FIG. 4 and the wot-1 (wide open throttle) position. The actuator member 102 and the switch plate 72 are shown in FIG. 5 with the actuator member in alternate contact engaging positions. With the actuator member 102 in the wot-1 position the bridging contact 134 engages the wot-1 contact 118, the accelerator pedal is allowed to actuate the throttle plate to full wide open throttle. The actuator member 102 is moved to this position for starting the engine, dechoking the carburetor and under certain vehicle operating conditions in which full engine power should be allowed. As noted in FIG. 6, the actuator means 102 is moved between the wot-1 position and the wot-2 position by high speed motor operation. Movement from wot-1 to wot-2 upon engine start-up with the transmission in neutral for operation of the governor in a neutral mode which will be described subsequently. Movement of the actuator member from the wot-2 to the wot-1 takes place when the vehicle speed is increased to a certain value, say 8 miles per hour and movement from wot-1 to wot-2 when the vehicle speed is decreased to a certain value, say 4 miles per hour. As further indicated in FIGURE, the actuator member 102 is moved by high speed motor operation to the reference position from either the wot-1 position, the wot-2 position or any intermediate position. This occurs when the engine speed exceeds an engine call-in value, say 275 RPM below the engine governed speed. This puts the governor in the engine governing mode, as will be described subsequently. This movement to the reference position also occurs when the road speed exceeds the road speed call-in value, say 2 miles per hour below the governed road speed. This places the governor in the road speed governing mode which will be described subsequently. Movement of the actuator member 102 from the wot-2 position to the reference position also occurs with the governor in the neutral mode when the engine speed exceeds the governed value or when the engine acceleration exceeds a certain value (precall activated), as will be described subsequently. When the actuator member 102 has reached the reference position, a reference position signal is applied to the control circuit 66 which is conditioned in response to the signal for producing motor control signals which are modulated to provide low speed motor operation in either the close throttle or open throttle direction, depending upon whether the speed is above or below the governed value. When the governor is operating in either the neutral mode or the engine governing mode, after the reference position has been reached, the motor will be operated at high speed to the wot-1 position if the engine speed falls below a drop-out value, say 450 RPM lower than the governed value. Similarly, when the governor is operating in the road speed governing mode, after the reference position has been reached, the motor will be operated at high speed to the wot-1 position if the road speed falls below the drop-out value, say 4 miles per hour below the governed value.

The electronic control circuit 66 will now be described with reference to FIGS. 7, 7A, 7B and 7C. The control circuit 66 comprises a microprocessor 202 which operates under program control and which includes a read only memory 204 which stores the operating program of the microprocessor. An engine speed signal generator 206 (FIG. 7B) and a road speed signal generator 208 (FIG. 7C) supply respective engine speed and road speed signals to the microprocessor. The reversible motor 62 is coupled with a motor driver circuit 158 which receives motor control signals from the microprocessor.

The microprocessor 202 is an integrated circuit chip with a self-contained read only memory 204 for storing the program of the microprocessor. It is a conventional integrated circuit chip, sometimes called a single-chip processor, type number 8048 and available from Intel Corporation. The program stored in the read only memory 204 is represented by the flow chart of FIG. 8. The microprocessor is provided with a clock 212 which is connected to pins 2 and 3. The supply voltage for the microprocessor is connected to pin 40 and the pin 20 is connected to ground.

Figure 7:
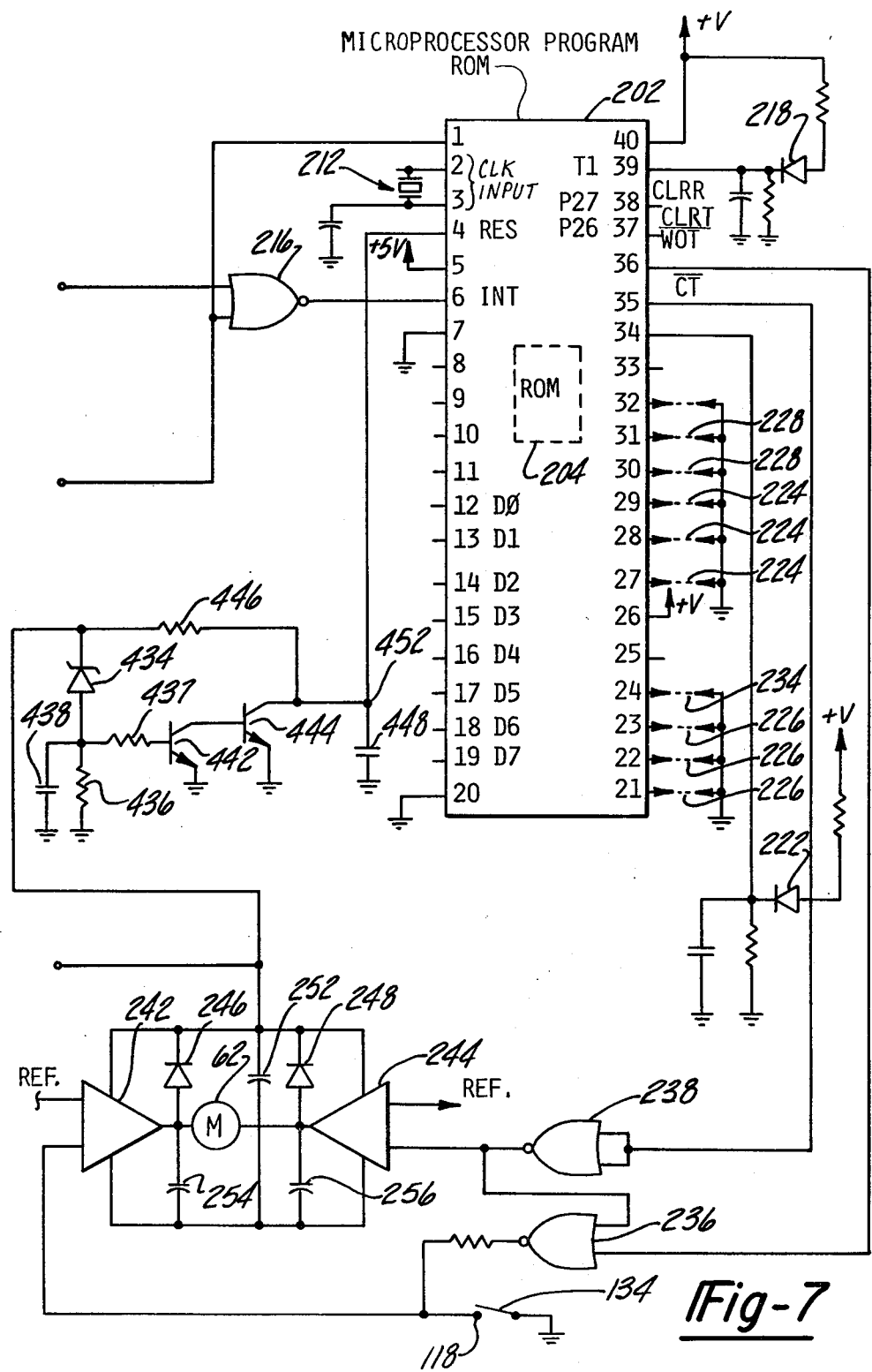
FIGS. 7, 7A, 7B and 7C comprise a a schematic of the electrical circuit of the governor.
Figure 7A:
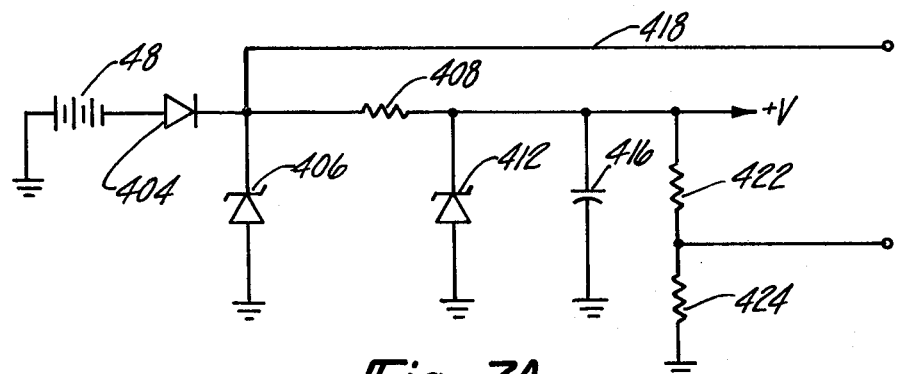

The supply voltage for the electronic control circuit 66 is provided by a power supply circuit 402 whown in FIG. 7A. The vehicle battery 48 of 12 volts serves as the voltage source for the power supply circuit. The power supply circuit includes a diode 404 connected with the positive terminal of the battery to protect the electronic circuit from connection to the battery with reverse polarity. A transient suppressing diode 406 is connected between the diode 404 and ground to portect the electronic circuitry against transient voltages. A resistor 408 and a zener diode 412 are connected between the node 405 and ground. The voltage across the zener diode 412 is equal to its breakdown voltage of 5 volts and is applied across a filter capacitor 414. Thus, a regulated voltage V+ is developed at the node 416. This regulated voltage V+ is applied to pin 40 of the microprocessor 202 and also serves as the supply voltage for the engine speed signal generator 206, the road speed signal generator 208 and the logic gates of the electronic control circuit. The unregulated voltage at the node 405 is supplied through a conductor 418 to the motor driver 36. The regulated voltage at node 416 is applied across voltage divider resistors 422 and 424 to develop a reference voltage at the junction of the resistors. This reference voltage is applied as indicated to the reference input terminals of the amplifiers 40 and 44 of the motor driver circuit.

Referring again to the microprocessor 202, a reset signal is applied to pin 4 to ensure that the microprocessor is reset on power-up or in the event that during operation the supply voltage should fall below a predetermined level. A reset signal is developed by a reset circuit 432 shown in FIG. 7. The reset circuit comprises a zener diode 434 and a series resistor 436 connected between the node 405 of the power supply 402 and ground. A capacitor 438 is connected across the resistor 436. A transistor 442 has its base connected through a resistor 443 to the junction of zener diode 434 and the resistor 436 and has its emitter connected to ground. The collector of transistor 442 is connected to the base of a transistor 444 which has its emitter connected to ground and its collector connected through a resistor 446 to the supply voltage node 405. A capacitor 448 is connected between the collector of transistor 444 and ground. A node 452 between the capacitor 448 and the collector of transistor 444 is connected to pin 4 to supply the reset voltage thereto. On power-up of the circuit, the voltage at node 405 from the battery 48 is supplied to the reset circuit 432. Initially the voltage across the capacitor 438 is low and the transistor 442 is turned off and transistor 444 is turned on. Thus, the voltage at the node 452 is low and the low voltage on pin 4 resets the microprocessor. After a brief time delay, the voltage across the capacitor 438 increases to a value which turns on the transistor 442 and turns off the transistor 444. Accordingly, the voltage across the capacitor 448 increases after a short time delay to a high value at the node 452 and this is applied to pin 4 of the microprocessor. In the event that the supply voltage at node 405 drops below a predetermined value, transistor 442 is turned off and transistor 444 is turned on. This discharges the capacitor 448 and a low voltage is applied to pin 4 to reset the microprocessor. When the supply voltage at node 405 returns to its normal value, the transistors 442 and 444 are switched and a high voltage at the node 452 is applied to pin 4.

Figure 7B:
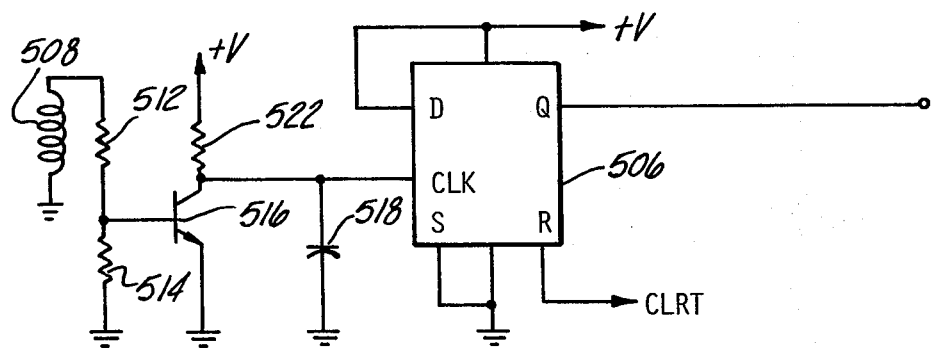
Figure 7C:
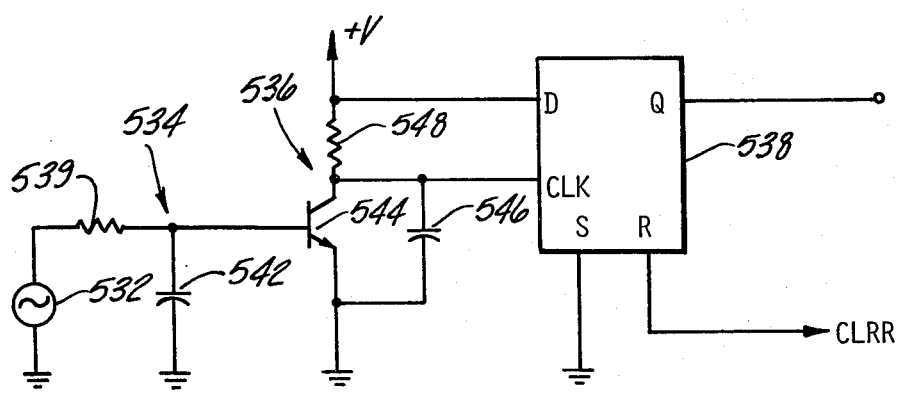

The engine speed signal generator 206 is shown in FIG. 7B. This signal generator is adapted to produce a train of pulses having a pulses having a pulse repetition rate corresponding to the engine speed. The engine speed is then determined by counting the number of pulses that occur within a given time interval. For a spark ignited engine, the ignition voltage taken at the primary winding of the ignition coil, constitutes a pulse train with a repetition rate corresponding to engine speed. For one revolution of an 8-cylinder engine, for example, there are 4 ignition pulses. For a diesel engine, the speed signal is suitably derived from a rotary transducer which is a permanent magnet generator coupled with the engine output shaft and which generates a train of pulses corresponding to engine speed.

The engine speed signal generator comprises, in general, an input circuit 502, a pulse forming circuit 504 and a flip-flop 506 for developing a train of pulses having a repetition rate corresponding to engine speed. The input circuit 502, connected with the primary winding of the ignition coil 508, comprises a pair of voltage divider resistors 512 and 514. The pulse forming circuit 504 comprises a switching transistor 516. A capacitor 518 is connected to the collector of the transistor 516 and, through a resistor 522, to the regulated voltage supply. The base of the transistor is connected to the junction of resistors 512 and 514 and the emitter is connected to ground. The capacitor 518 is charged from the regulated voltage supply through the resistor 522 when the transistor 516 is turned off and it is discharged through the transistor when it is turned on. Each ignition pulse turns on the transistor 516 and accordingly a train of positive pulses, each pulse corresponding with an ignition pulse, is developed across the capacitor 518 at the node 524. The flip-flop 506 has its clock input connected with the node 524 and thus goes to logic high with each pulse. The data input is tied to logic high and the set input is tied to ground. The Q output of the flip-flop is connected with one input of the NOR gate 216. The reset input of the flip-flop is connected with pin 37 of the microprocessor. The flip-flop 506 produces an engine speed signal comprising a train of rectangular output pulses at the Q output with each pulse corresponding to an input pulse at the clock input. The engine speed signal is applied through the NOR gate 216 to the interrupt input at pin 6 of the microprocessor. The flip-flop is reset in response to each pulse applied to pin 6 by a reset pulse CLRT from pin 37. The microprocessor, as will be described subsequently, computes the value of engine speed by measuring the time interval between a predetermined number of pulses in the speed signal. For an 8-cylinder engine the time interval between 9 pulses is measured, for a 6-cylinder engine the time interval between 7 pulses is measured and for 4-cylinder engine the time interval between 5 pulses is measured.

The road speed signal generator 208 is adapted to generate a train of pulses having a pulse repetition rate corresponding to the road speed of the vehicle. For this purpose, it comprises, in general, a rotary transducer 532, an input circuit 534, a pulse forming circuit 536 and flip-flop 538. The transducer 532 is a permanent magnet generator adapted to be driven by the output shaft of the vehicle transmission. The transducer produces the sine wave output voltage having a frequency corresponding to road speed; for example, output voltage wave has 8 positive pulses per shaft revolution. The output of the transducer 532 is connected to the input circuit which includes a series resistor 538 and shunt capacitor 542 and which is coupled to the pulse forming circuit 536. The pulse forming circuit 536 includes a switching transistor 544 connected across a capacitor 546. The capacitor 546 is connected with the collector of the transistor 544 and through a resistor 548 to the regulated voltage supply V+. The emitter of the transistor 544 is connected to ground and the base is connected to the junction between the resistor 538 and capacitor 542. The output of the pulse forming circuit 536 is taken from the capacitor 546 and is applied to the clock input of the flip-flop 538. The flip-flop has its data input tied high by connection to the regulated supply voltage and the Q output is connected to the other input of the NOR gate 216. The set input of the flip-flop is connected to ground and the reset input is connected to pin 38 of the microprocessor. In operation, each positive pulse from the transducer 532 turns on the switching transistor 544 and discharges the capacitor 546. Thus a pulse train of positive pulses is developed across the capacitor 546. In response to the input pulses at the clock input, the flip-flop 538 produces a road speed signal on its Q output. The road speed signal comprises a train of logic high pulses having a pulse repetition rate corresponding to road speed. This road speed signal is applied through the NOR gate 216 to the interrupt pin 6 of the microprocessor. The flip-flop 538 is reset in response to each pulse applied to pin 6 by a reset pulse CLRR from pin 38. The microprocessor, as will be described subsequently, computes the value of road speed by counting the number of pulses in the road speed signal which occur in a predetermined time interval.

The engine speed signal from the signal generator 206 is applied to one input of a NOR gate 216 which has its output connected to the interrupt pin 6 of the microprocessor. The road speed signal from the signal generator 208 is applied to the other input of the NOR gate 216. The road speed signal is also applied to pin 1 of the microprocessor for the purpose of distinguishing the road speed signal from the engine speed signal. Pins 5, 7 through 19 and 25, 26 and 33 are not used. A clear signal CLRR is developed on pin 38 of the microprocessor and is applied to the road speed signal generator 208 for use in the speed computation as performed by the microprocessor. Similarly, a clear signal CLRT is developed on pin 37 and applied to the engine speed generator 206. The reference contact 128 on the switch plate 72 is connected through a pull-down circuit 218 to pin 39. Similarly, the wot-2 contact 124 on the switch plate 72 is connected through a pull-down circuit 222 to the pin 34. The microprocessor operates under program control to develop a wide open throttle signal (wot signal) on pin 36. A close throttle signal (CT signal) is developed on pin 35. The wot signal on pin 36 and the CT signal on pin 35 are applied to the motor driver circuit 158, as will be described subsequently.

The microprocessor includes programmable inputs which are used for establishing the parameters of a particular vehicle installation. Such parameters include the values of road speeds and engine speeds for the governing operation. In particular, pins 27, 28 and 29 are used for programming in up to eight different road speed values, such programming being effected by removing or leaving in the removable grounding links 224. Similarly, pins 21, 22 and 23 are used for programming up to eight different engine speeds by the grounding links 226. Additionally, pins 30 and 31 are used for programmming, by links 228, in the number of cylinders of the internal combustion engine, the two binary bits being sufficient for coding two, four, six or eight cylinders. Pin 24, with links 232, is alternately set for inhibiting the input of the road speed signal so that the governor responds only to the engine speed signal set to enable the neutral mode of operation. Pin 32 with links 234 is used for optionally selecting the precall activation which may be used in the neutral mode for providing governor response to a predetermined value of engine acceleration, as will be described subsequently.

The motor driver circuit 158 receives the motor control signals, i.e. the wot signal on pin 36 and the CT signal on pin 35 through a pair of logic gates 236 and 238, respectively. The motor driver circuit 212 is a so called half-H circuit of known design. It includes a pair of amplifiers 242 and 244 which are adapted to reversibly energize the motor 62 in accordance with the motor control signals. The output of the amplifier 242 is connected to one motor terminal and the output of amplifier 244 is connected with the other motor terminal. A pair of fast switching diodes 246 and 248 are connected between the motor voltage supply terminal and the respective motor terminals to dissipate the inductive transient voltages arising from motor energization. A capacitor 252 is connected across the supply voltage terminal and ground and capacitors 254 and 256 are connected respectively from the motor terminals to ground for the purpose of slowing down the motor switching action to inhibit oscillations in the circuit.

The microprocessor, under program control, causes the wide open throttle signal (wot signal) at pin 36 to go to logic low when program execution calls for moving the actuator member 102 of the governor toward the wide open throttle position. Thus, when the wot signal is at logic low, the motor 62 is to be energized for rotation in the counterclockwise direction. The microprocessor under program control, causes the close throttle signal (CT signal) at pin 35 to go to logic low when program execution calls for the actuator member 102 to be moved toward the close throttle position, i.e. the motor is to be energized in the clockwise direction. The wot signal from pin 36 is applied to one input of the NOR gate 236 and is inverted at the output of this gate. The output of the gate 236 is applied through a resistor 258 to the signal input of the amplifier 244. The reference input of the amplifier 244 is connected to a reference voltage source. The CT signal from the pin 35 is applied to both inputs of the NOR gate 238 and this gate functions to invert the signal at the output. The output of the gate 238 is applied to the signal input of the amplifier 244. The reference input of amplifier 244 is connected to the reference voltage source. The output of the gate 238 is also connected to the other input of the NOR gate 236 to ensure that the outputs of the gates 236 and 238 will always be in opposite logic states. The wot-1 contact 118 on the switch plate 72 is connected to the signal input of the amplifier 242 through a conductor 262 so that this input is grounded when the bridging contact 134 engages the wot-1 contact. Thus, the bridging contact 134 and wot-1 contact 118 serve as a limit switch to shut off the motor when the wot-1 position is reached.

Figure 8A:
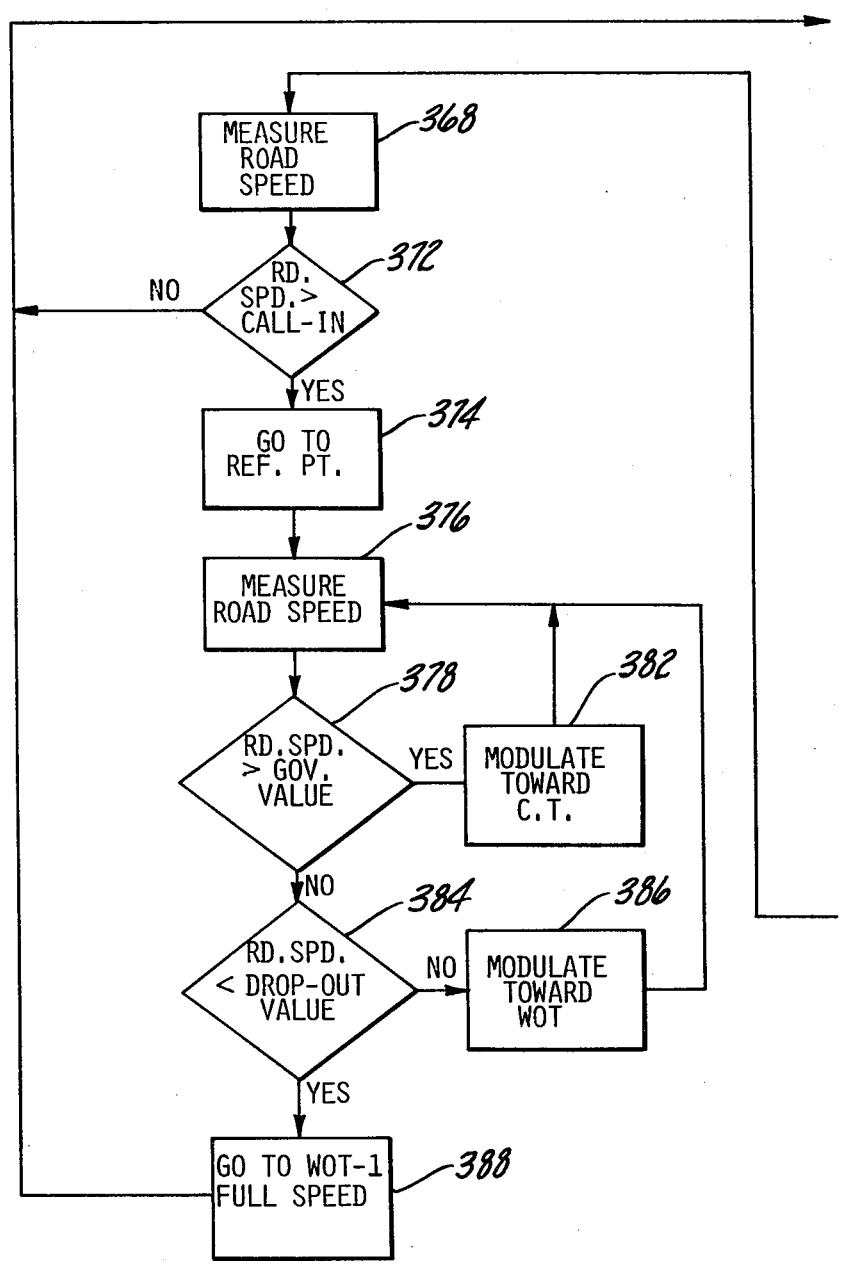
Figure 8B:
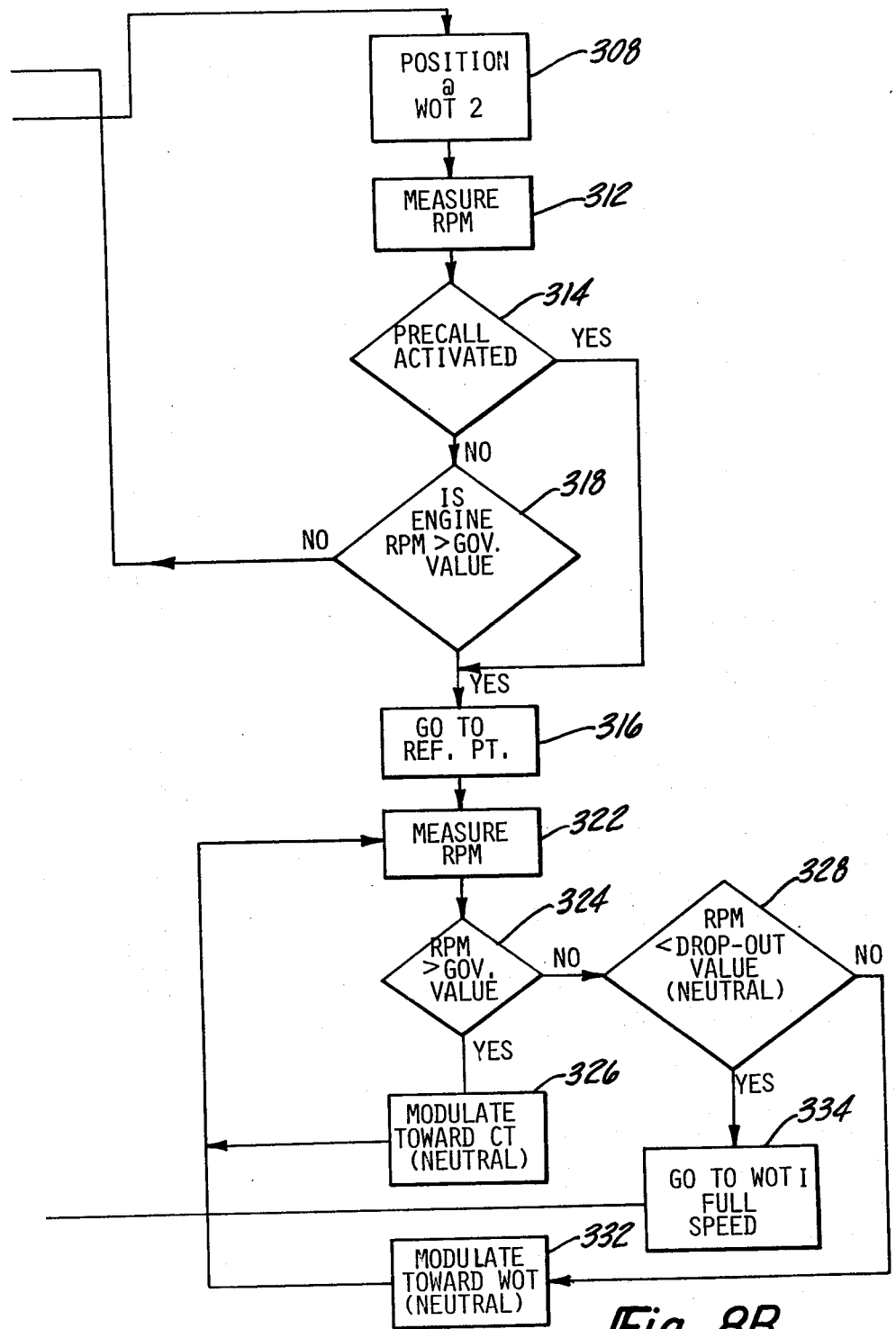

The operation of the governor will be described with reference to the flow chart which is shown in three parts in FIGS. 8A, 8 and 8B, respectively. (The drawing sheets containing FIGS. 8A, 8 and 8B are to be arranged side-by-side in the order named and the interconnecting lines will match-up to depict the entire flow chart in one view.) In general, FIG. 8 shows an initializing procedure and the engine speed governing mode, FIG. 8B shows the neutral governing mode and FIG. 8A shows the road speed governing mode. The flow chart represents the operating program stored in the read only memory 204 of the microprocessor 202.

The start block 302 (FIG. 8) is operative to power-up the electronic control circuit when the engine ignition is turned on and at the same time the microprocessor is reset for commencing operation. Before the control circuit is powered-up, the actuator member 102 is at the wot-1 position. The test block 304 determines whether the engine is running by comparing the actual engine speed with 250 RPM, a value lower than the lowest idle speed of the engine. If the answer is no, meaning that the engine is running, the program advances to test block 306 which determines whether the road speed signal is zero. A yes answer signifies that the vehicle is at standstill with the engine running, the transmission is in neutral and the neutral governing mode operation is called for. Accordingly, the program advances from the test block 306 to the block 308 (FIG. 8B) which calls for the actuating member 102 to be positioned at the wot-2 position. Accordingly, the wot signal from the microprocessor pin 36 goes low and the motor 62 is energized in the close throttle direction. The motor is thus energized to move the actuator member 102 until the bridging contact 134 engages the wot-2 contact. This produces a wot-2 signal at pin 34 of the microprocessor which switches the motor control signals to stop the motor at the wot-2 position.

With the transmission in neutral and the engine in an unloaded condition, it is more susceptible to overspeed, such as by the driver pushing the accelerator pedal to the floor. With the actuator member 102 in the wot-2 position, it is in an advanced location so that it can move on to fully closed throttle in short time in the event of a sudden overspeed. After the actuator member 102 is moved to the wot-2 position, as called for by the block 308, the program advances to block 312 which calls for a measurement of the engine speed. This is effected by activating the interrupt pin 6 and the microprocessor computes the instantaneous engine speed and processes the engine speed signal. The program then advances to the test block 314 which calls for the engine speed signal to be processed to determine whether the engine acceleration exceeds a predetermined value. The predetermined acceleration value, for example, occurs if the engine speed increases from 1800 RPM to 2100 RPM in a period less than 250 milliseconds. If the test block 314 determines that the predetermined acceleration value, known as the precall value, is exceeded, i.e. the precall is activated and the program advances to block 316. This precall procedure enables an early determination of impending engine overspeed so that timely correction can be made. If, on the other hand, the test block 314 determines that the precall value is not exceeded, the program advances to the test block 318. The test block 318 determines whether the engine speed is above the governed value, for example, 4300 RPM. If it is not then the program returns to the test block 304. If the engine speed is above the governed value, the program advances to the block 316.

Block 316 calls for the actuator member 102 to be moved at high speed to the reference point so that the actuator member is positioned in a more advanced position relative to the close throttle position and is in a position to exercise smooth governing action on the engine speed. When the actuator member 102 reaches the reference point the bridging contact 134 engages the reference contact 128 and a reference point signal is supplied to pin 39 of the microprocessor. This causes the system to enter the reference point governing mode and the microprocessor, under program control, produces slow speed motor control signals for moving the actuator member 102 at slow speed within a small range above and below the reference point. The program then advances to the block 322 which calls for measurement of engine speed. Then the program advances to the test block 324 which determines whether the engine speed is greater than the governed value. If the answer is yes, the program advances to the block 326 which calls for the microprocessor, under program control, to produce a slow or modulated close throttle signal at the microprocessor pin 35. Accordingly, the motor is energized for slow operation in the close throttle direction to move the actuator member 102 to reduce the throttle opening and hence the engine speed. The program then returns to the block 322 which causes another engine speed measurement to be taken. If the engine speed, as determined by test block 324, remains at a value greater than the governed value, the program advances through blocks 326 and 322 to the test block 324 once again.

If the test block 324 determines that the engine speed is less than the governed value, the program advances to the test block 328 which determines whether the engine speed is less than a drop-out value, for example, 350 RPM. Such a low engine speed signifies that the engine speed is so far below the over speed value that further governing for the time being is no longer necessary. If the test block 328 determines that the engine speed is above the drop-out value, the program advances to block 332 which calls for the microprocessor, under program control, to cause the motor to be energized at slow or modulated speed toward the wide open throttle position. The program then returns to the block 322 for another engine speed measurement. The program then advances through the test block 324 as previously described. If it is determined at test block 328 that the engine speed is below the drop-out value, the program advances to block 334 which calls for the microprocessor to produce a wot signal on pin 35 to energize the motor at full speed to move the actuator member 102 to the wot-1 position. When the wot-1 position is reached, the switching contact 134 engages the wot-1 contact 118 and the motor is stopped with the actuator member in the wot-1 position. When the program returns to the test block 304 it determines whether the engine is running, i.e. is the speed less than 250 RPM. If it is not, the program advances to the test block 306 which determines whether the road speed is zero. If so, the neutral mode of governor operation is invoked once again and the program loop just described is repeated.

If test block 304 determines that the engine speed is less than 250 RPM, the program advances to block 306 and if the road speed is not zero, as determined by test block 306, then it is known that the transmission is in gear with the engine running and the neutral governing mode is by-passed and the program proceeds to block 336. The block 336 calls for the microprocessor, under program control, to produce a wot signal on pin 36 to energize the motor at high speed to move the actuator member 102 to the wot-1 position. The governor may proceed in its operation from this point to enter either the engine governing mode or the road speed governing mode depending upon operating conditions as described below.

With the actuator member positioned at the wot-1 position, as called for by block 336, the program then advances to block 338 which calls for a measurement of engine speed. The program proceeds to the test block 342 which determines whether the precall is activated signifying an excessive engine acceleration. If the answer is yes, the program advances to block 344; if the answer is no, it proceeds to the test block 346. Block 346 determines whether the engine speed is greater than the predetermined call-in value which is an engine speed below but sufficiently close to the governed speed of the engine so that engine governing is required to ensure against overspeeding. The engine speed call-in value is for example, 275 RPM below the governed speed of 4300 RPM. If the answer to the test block 346 shows that engine speed is greater than the call-in value, the program proceeds to block 344 and thus enters the engine governing mode.

The operation of the governor in the engine governing mode includes a program sequence represented by blocks 352, 356, 358, 362 and 364. This program sequence is identical to the program sequence described for the neutral mode of operation with respect to blocks 322, 324, 326, 328, 332 and 334, in the preceding description. Thus, the description of this operation will not be repeated. It is noted, however, that the program exits from the engine governing mode at block 364 when the engine speed is less than the drop-out value. In this event, the program returns from block 364 to the test block 304. Thus, the program may advance from test block 304, as previously described to test block 306 and thence enter the neutral engine governing mode as previously described. Alternatively, the program may advance from test block 304 to block 336 and thence through blocks 338 and 342 to the test block 346, as previously described. If test block 346 determines that the engine speed is greater than the call-in value, then the program will proceed to block 344 and reenter the engine governing mode, as previously described; however, if test block 346 determines that the engine speed is less than the call-in value, the program will enter the road speed governing mode by proceeding to block 368.

In the road speed governing mode, block 368 calls for a measurement of road speed. The test block 372 then determines whether the road speed is greater than a call-in value, for example, 2 miles per hour below the governed speed of 55 miles per hour. If not, there is no need for road speed governing and the program returns from block 372 to the test block 304 to start the program execution over again. If on the other hand, test block 372 determines that the road speed is above the call-in speed the program advances to the block 374 which calls for the microprocessor to produce a close throttle signal on pin 35 to energize the motor at high speed in the close throttle direction to advance from the wot-1 position to the reference point. With the actuator member 102 at the reference point, the program proceeds to block 376 which calls for a measurement of road speed. From the block 376, the program proceeds to the test block 378 which determines whether the road speed is greater than the governed value. If it is, the program proceeds to the block 382 which calls for the microprocessor to produce a close throttle signal on pin 35 which energizes the motor at slow speed in the close throttle direction. The program then returns to the block 376 for another measurement of road speed. If the road speed continues to be higher than the governed value, block 382 is operative to cause the motor to continue operation at slow speed in the close throttle direction. If block 378 determines that the road speed is not greater than the governed value the program proceeds to the test block 384. This block determines whether the road speed is less than the drop-out value, for example, 4 miles per hour less than the governed speed. If it is not, the program proceeds to block 386 which calls for the microprocessor to produce a wot signal on pin 36 to energize the motor at slow speed in the wide open throttle direction. The program then returns to block 376 for another measurement of road speed. The program then proceeds to test block 378 and when it is determined by block 378 that the road speed is less than the governed value and it is determined by block 384 that the road speed is less than the drop-out value, the program will proceed to block 388. Block 388 calls for the microprocessor to produce a wot signal on pin 36 which will energize the motor at full speed in the wide open throttle direction. When the motor reaches the wot-1 position, the bridging contact 134 engages the wot-1 contact 118 and the motor is stopped in the wot-1 position. The program then loops back from block 388 to the test block 304 and the program is executed again in the same manner as described above.

The operating program for the microprocessor, as described above with reference to FIGS. 8, 8A and 8B, includes blocks labeled "Measure RPM", blocks labeled "Measure Road Speed", and blocks labeled "Precall Activated". The program represented by these blocks will now be described in more detail.

Figure 9:
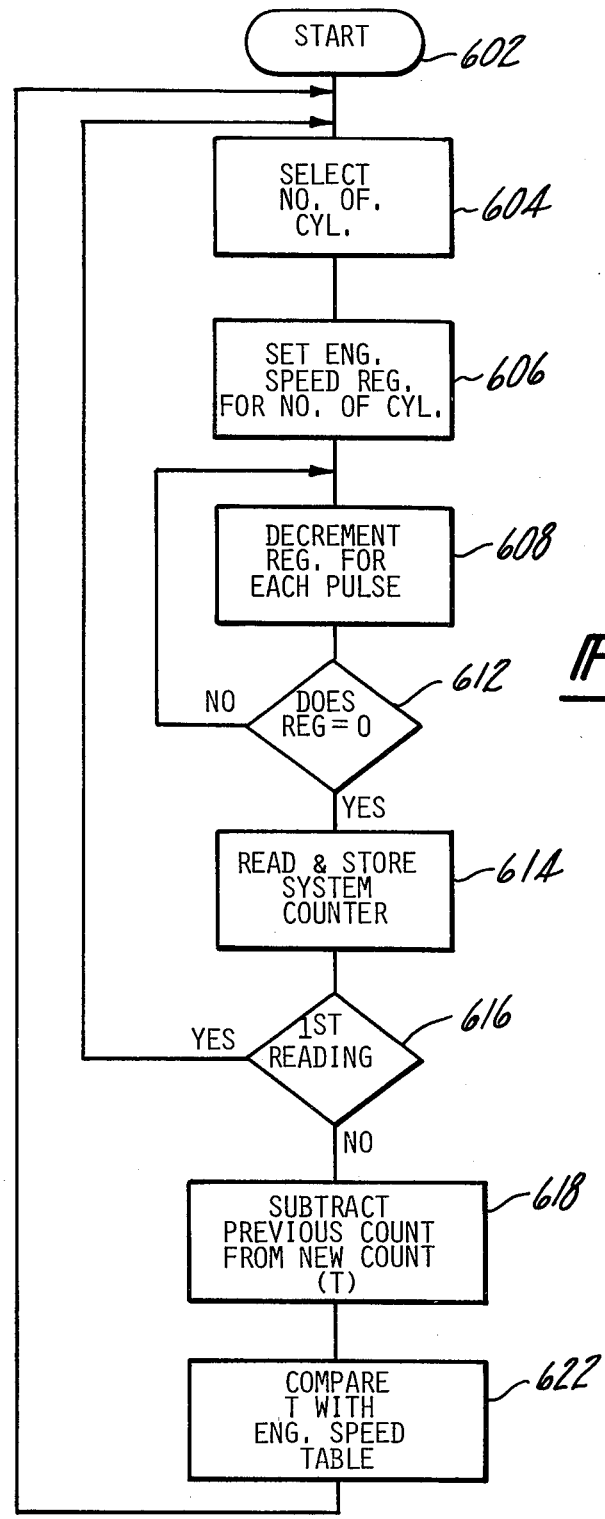

That part of the program represented by blocks labeled "Measure RPM" such as blocks 338, 312, 322 and 352 are represented by a subroutine which is depicted in FIG. 9. This subroutine for measuring the engine speed is initiated at block 602 which starts the subroutine. As described above, the measurement depends upon the number of cylinders of the engine which is preprogrammed in the memory. Block 604 calls for reading the number of cylinders and block 606 sets the engine speed register to the number of cylinders. For example, for an 8-cylinder engine the engine speed register is set to 8. The program then advances to block 608 which decrements the engine speed register for each pulse of the engine speed signal. The test block 612 determines whether the engine speed register is equal to zero, i.e. whether 9 pulses have been received. If the answer is no, the program loops back to block 608. If the answer is yes, the program advances to block 614 which causes the system counter to be read and the value to be stored. The system counter is incremented every 80 milliseconds by an internal clock. The test block 616 determines whether this is the first reading of the system counter. If it is, the program loops back to block 604. If the answer is no, the program advances to block 618 which subtracts the previous count from the new count in the system counter to obtain the time T which elapsed during the last count-down of the engine speed register. The program then advances to block 622 which compares the time T with the engine speed table and the measured value of engine speed is produced from the table.

Figure 10:
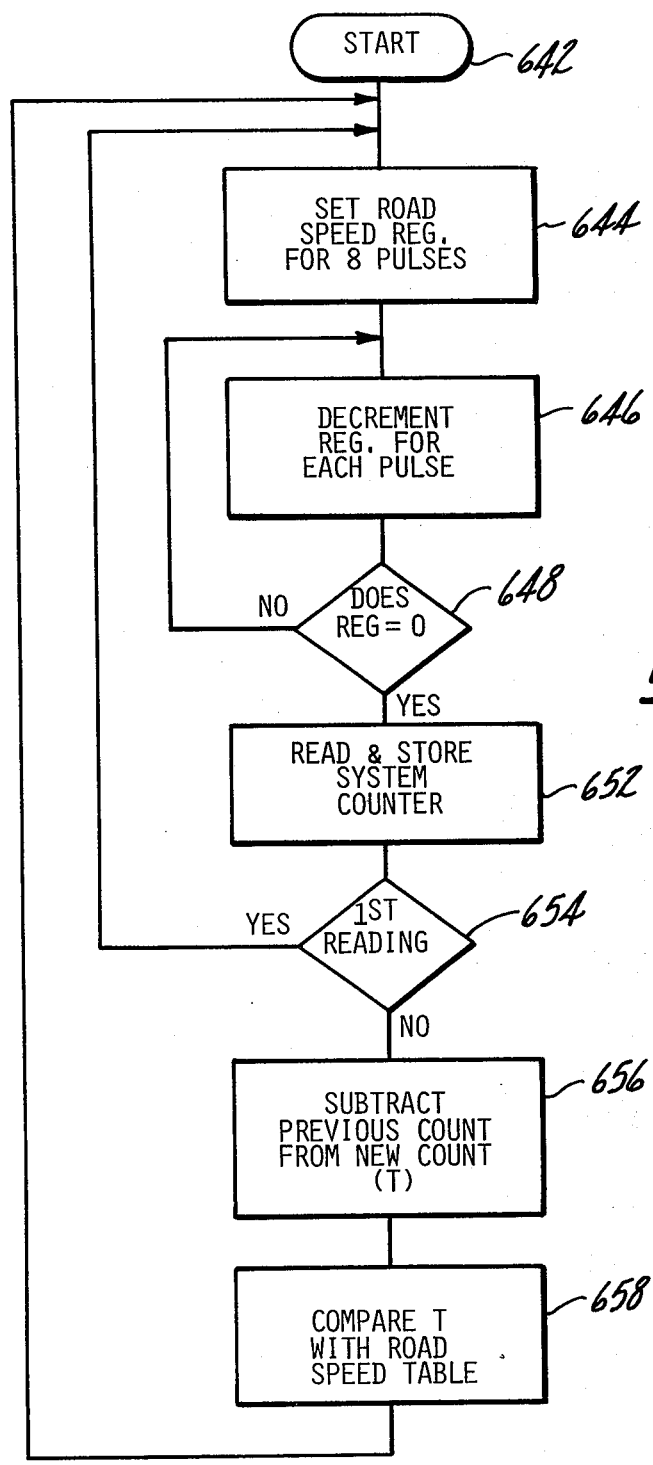

The blocks in FIGS. 8, 8A and 8B labeled "Measure Road Speed", such as blocks 368 and 376 represent a subroutine which is depicted in FIG. 10. The subroutine for measuring road speed is initiated by the block 642. As described above, the road speed signal includes 8 pulses for each revolution of the transmission output shaft. The RPM of the output shaft corresponds to road speed. Block 644 sets the road speed register for 8 pulses and the program advances to block 646 which decrements the register for each pulse. Test block 648 determines whether the register has been decremented to zero. If the answer is no, the program loops back to block 646. If the answer is yes, the program advances to block 652 which reads and stores the value in the system counter. Then the test block 654 determines whether this is the first reading of the system counter. If it is, the program loops back to block 644. If it is not the first reading, the program advances to block 656 which subtracts the previous reading of the system counter from the current reading of the system counter to obtain the time T for the count-down to zero. In block 658, the time T is compared with the road speed table and the value of road speed is produced from the table.

Figure 11:
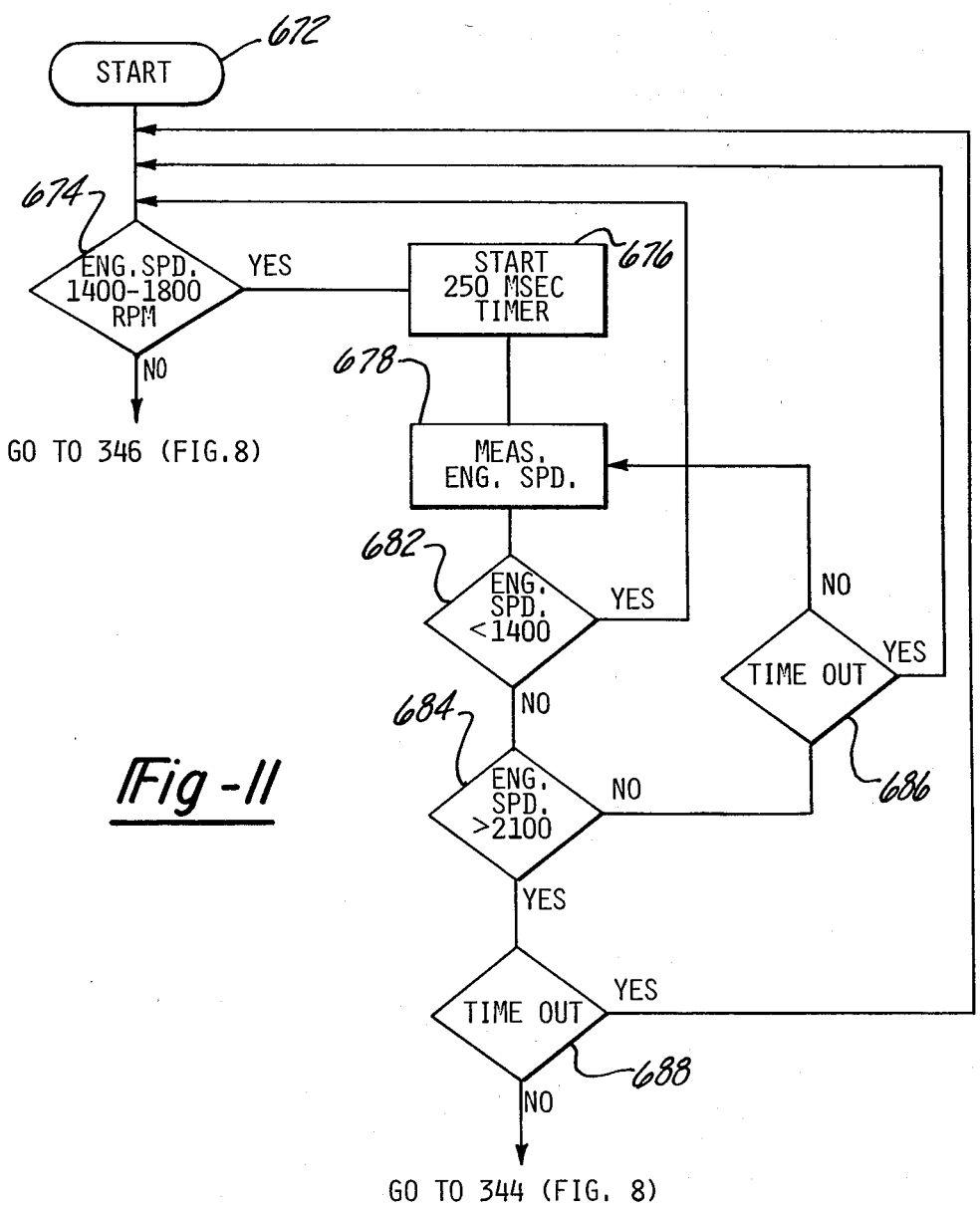

In the program flow charts of FIGS. 8, 8A and 8B, the blocks labeled "Precall Activated" are represented by the subroutine depicted in FIG. 11. As described above, the test block "Precall Activated" determines whether the engine acceleration exceeds a certain value as the engine speed increases through a speed window from say, 1400 RPM to 2100 RPM. The subroutine is initiated at block 672 and the block 674 determines whether the engine speed is between 1400 and 1800 RPM. It it is not, the program proceeds to block 346 (FIG. 8). If the speed is between 1400 and 1800 RPM, the program advances to block 676 which starts a 250 millisecond timer. The block 678 measures engine speed and the test block 682 determines whether the engine speed is less than 1400 RPM. If the answer is yes, the program loops back to block 674. If the answer is no, the program advances to block 684 which determines whether the engine speed is greater than 2100 RPM. If the answer is no, the program proceeds to test block 686 which determines whether the timer has timed out. If the answer is yes, the program loops back to block 674. If the answer is no, the program loops back to block 678 for another speed measurement. If the answer is yes at test block 684, the program proceeds to block 688 which determines whether the timer has timed out. If the answer is yes, the program loops back to block 674 and starts over. If the answer is no, the program advances to block 344 (FIG. 8) which causes the motor to be energized at full speed to move the actuator to the reference point which initiates the reference point governing mode.

As described above, the motor 62 is operated at "full speed" (sometimes referred to as high or maximum speed) by the programmed control of the microprocessor, under certain operating conditions of the vehicle. Further, as described above, the motor 62 is operated at "slow speed" by the programmed control of the microprocessor under certain vehicle operating conditions. These terms, "full speed" and "slow speed", have been used to facilitate the explanation of the governor. The term "full speed" as used herein, means the maximum speed available from the motor 62 when it is energized with an unmodulated control signal. In order to obtain the desired maximum motor speed and still use the smallest feasible motor size, the motor is operated at about one and one-half times its rated voltage. In particular, the motor 62 is rated for 7.5 volts unmodulated supply voltage and it is supplied from a nominal 12 volt source. The motor is capable of withstanding this overvoltage because the governor operation requires only intermittent full speed operation and, when operated at slow speed, it is pulse rate modulated, so that the motor has a low duty cycle. The term "low speed" as used in the preceding description and that which follows, is used in a generic sense to distinguish it from "full speed" and also to mean a particular range of speeds which will be defined subsequently.

The microprocessor 212 is programmed to produce motor control signals, i.e. the wot signal at pin 36 and the CT signal at pin 35, which will energize the motor at selectively different speeds according to operating conditions. Speed control is provided primarily by pulse rate modulated motor control signals and in certain conditions pulse width modulation may be used in conjunction with pulse rate modulation. In governor operation there are operating conditions in which full speed motor operation is desired, i.e. the motor is to be operated at its maximum speed. The full speed motor operation is obtained by causing the microprocessor to produce an unmodulated wot signal on pin 36 or an unmodulated CT signal on pin 35, as the case may be. Low speed, as required by differing operating conditions, is obtained by causing the microprocessor to produce a modulated wot signal on pin 36 or a modulated CT signal on pin 35. The slow speed of motor operation is different when the governor is operated in the neutral mode, the engine governing mode and the road speed governing mode, as will be described below.

As described above, the neutral mode of governor operation is invoked when the engine is running without a load. In this operating condition, the actuating member 102 is moved first to the wot-2 position so that in this advanced or head-start position, it can quickly reach the reference point which corresponds approximately to a half-open throttle. This enables quick response to sudden overspeed. Then after precall is activated or if engine speed is greater than governed speed, the activating member 102 moves at full speed to the reference point. This initiates the reference point governing mode to obtain "smooth governing" which will be described subsequently. It is desirable in this governing action to use a slow motor speed and to effect governing with very small excursions of the actuating member 102 from the reference point. For this purpose, the slow speed for the neutral mode, called the "neutral mode slow speed", is achieved by pulse rate modulation of the wot signal with an off-time of 637 milliseconds and an off-time for the CT signal of 500 milliseconds. The on-time for the CT signal is 12.5 milliseconds and the on-time for the wot signal is 7.5 milliseconds. (The difference in the modulating time is provided to compensate for the throttle return spring force on the actuator member and provide about the same speed of movement in both directions.)

The engine speed governing mode is invoked if either the precall is activated or if the engine speed is above the call-in value, say 275 RPM below the governed engine speed. Either of these conditions causes the actuating member 102 to be moved at full speed to the reference point. This initiates the reference point governing mode to obtain "smooth governing" which will be described subsequently.

In the engine speed governing mode, the slow speed is somewhat higher than the slow speed for neutral governing mode and is known as the "engine governing mode low speed". This low speed is obtained by a wot signal with the off-time of 637 milliseconds and a CT signal with an off-time of 100 milliseconds. The on-time is 12.5 milliseconds for both.

The road speed governing mode, as described above, is invoked when the vehicle is running at road speed and the engine speed is less than the call-in value, assuming the precall was not activated. The system goes into the road speed governing mode when the road speed increases above the call-in value, say 2 miles per hour below governed speed, and it remains in this mode unless the speed decreases below the drop-out value, say 4 miles per hour below governed speed. Upon reaching call-in speed, the actuator member 102 will be moved at full speed to the reference point. This initiates the reference point governing mode to obtain "smooth governing" which will be described subsequently. In the road speed governing mode, several different values of slow speed are used to obtain the desired governing action. In general, there is a different slow speed for each of several speed bands or windows encompassing the governed speed. These different slow speeds and the associated speed band are as follows: First, there is a deadband encompassing the governed speed which is approximately 1 mile per hour wide and with a governed speed of say 55 miles per hour the deadband would extend from 54.5 to 55.5 miles per hour. In the deadband, the microprocessor produces motor control signals which shut-off the motor and thus, in this band, the actuator member 102 is at a standstill. This is referred to herein as the "deadband slow speed". Next, there is a band #1 which is approximately 2 miles per hour wide and is effective from 54.0 to 54.5 miles per hour and from 55.5 to 56.0 miles per hour. In band #1 the slow speed is produced by one-shot of pulse modulation of the motor control signals for a fixed time interval, say an interval of 320 milliseconds and it is not repeated while the speed remains in band #1. This pulse modulation has an off-time of 15 milliseconds for the CT signal, an off-time of 50 milliseconds for the wot signal and an on-time of 12.5 milliseconds for both. This low speed is called the "band #1 low speed". Next, there is a band #2 which is approximately 7 miles per hour wide and is effective from 53.0 to 54.0 miles per hour and from 56.0 to 57.0 miles per hour. For band #2, the slow speed of the motor is produced by intermittent modulation in which a modulated signal is produced for a period of 125 milliseconds followed by no signal for a period of 250 milliseconds an so on, alternately. The modulated signal has an off-time of 15 milliseconds for the CT signal and an off-time of 50 milliseconds for the wot signal, both having an on-time of 12.5 milliseconds. (This modulation rate is referred to as "regular modulation".) This slow speed of motor operation is referred to as "band #2 slow speed". Next, there is a band #3 which extends between the drop-out value, say 4 miles per hour below governed speed, and the overspeed value, say 4 miles per hour above governed speed. This is effective from 51 miles per hour to 53.0 miles per hour and from 56 miles per hour to 59 miles per hour. In band #3, the motor control signals are produced by the regular modulation referred to above. This low speed is referred to as "band #3 low speed".

The program, as described above, with reference to the flow chart depicted in FIG. 8A includes operation of the governor in the road speed governing mode. In this governing mode, the microprocessor under the program control energizes the motor to cause the actuator to move to the reference point when the road speed is greater than the road speed call-in value. This initiates operation of the governor in the reference point governing mode, as described above. Operation of the governor in the reference point governing mode is shown in FIG. 8A in blocks 376, 378, 382, 386 and 388, and this operation was described above. The operation in the reference point governing mode is shown in greater detail in FIG. 12 to include the operation of the motor at different values of slow speed.

Figure 12:
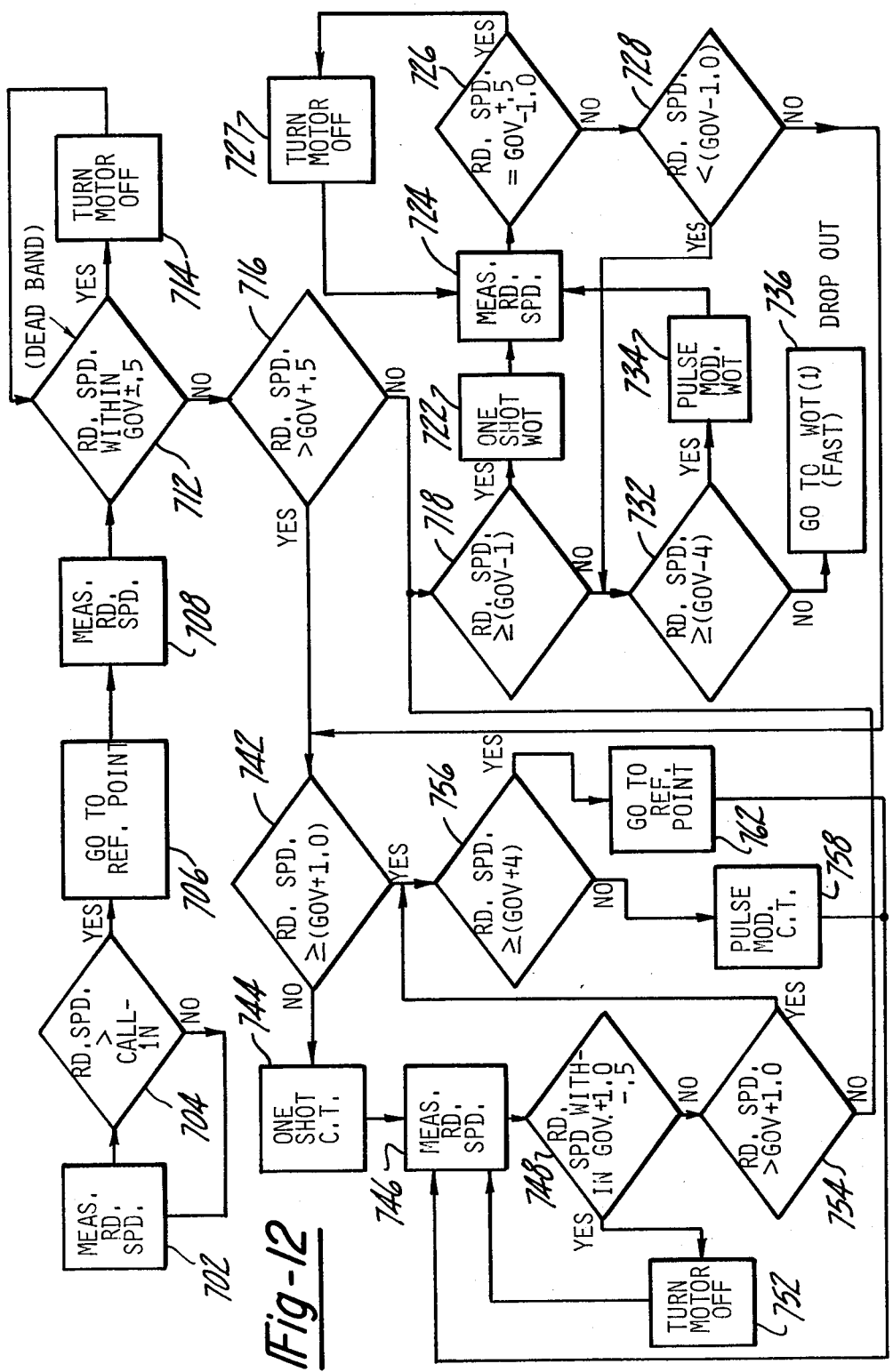

Referring now to FIG. 12, block 702, 704 and 706 correspond with blocks 368, 372 and 374 of FIG. 8A and cause the reference point governing mode to be initiated when the road speed is greater than the call-in value. The program advances from block 706 to block 708 which measures the road speed and the test block 712 determines whether the road speed is within the deadband. If it is, the program advances to block 714 which turns off the motor and the program loops back to the test block 712. If the speed is not within the deadband, the program advances to the test block 716 which determines whether the road speed is outside of the deadband on the high speed side, i.e. whether it is above the high speed limit of the deadband. If the answer is no, the program proceeds to the test block 718 which determines whether the road speed is above the lower limit of the band #1. If the answer is yes, the program advances to block 722 which energizes the motor with one shot in the open throttle direction at the band #1 slow speed. The program then advances to block 724 which measures the road speed and then block 726 determines whether the road speed remains within the deadband end below and above the lower limit of the band #1. If the answer is yes, the motor is turned off at block 728. If the answer is no, the program proceeds to test block 728 which determines whether the road speed is below the lower limit of band #1. If it is not, the program returns to test block 716. If it is, the program advances from block 728 to test block 732 which determines whether the road speed is above the lower limit of the band #2. If it is, the program advances to block 734 which causes the motor to be energized in the open throttle direction at the band #2 slow speed. The program then advances from block 734 to block 724 for another speed measurement. If the answer to test block 732 is no, the program advances to block 736 whch energizes the motor at full speed to move the actuator to the wot-1 wide open throttle position.

If, at test block 716, it is determined that the answer is yes, i.e. the road speed is above the upper limit of the deadband, then the program proceeds to test block 742 which determines whether the road speed is above the upper limit of band #1. If it is not, the program advances to block 744 which causes the motor to be energized in the close throttle direction with one shot for operation at the band #1 slow speed. The program advances from block 744 to block 746 for measurement of road speed. Then, test block 748 determines whether the road speed remains below the upper limit of band #1 and within the lower limit of the deadband. If the answer is yes, block 752 turns the motor off and the program returns to block 746 for measurement of road speed. If the answer to test block 748 is no, the program advances to block 754 which determines whether the road speed is above the upper limit of the band #1. If the answer is yes, the program advances to test block 756 which determines whether the road speed is above the upper limit of the band #2. If the answer is no, the program advances to block 758 which causes the motor to be energized in the close throttle direction at the band #2 slow speed. Then the program returns to the block 746 for another measurement of road speed. If, at test block 756 the answer is yes, the program proceeds to block 762 which causes the motor to be energized at full speed to move the actuator to the reference point. Then the program proceeds to block 746 for another measurement of road speed. If, at test block 754 the answer is no, the program proceeds to test block 718 and the program proceeds as previously described.

The governor operates in the neutral governing mode, as described above, when the engine is running in an unloaded condition. The actuator 102 is moved at full speed from the wot-1 position to wot-2. It then moves at full speed from the wot-2 position to the reference point. In the reference point governing mode, the motor 62 is energized for operation at the "neutral governing mode slow speed", as defined above. This slow speed of motor operation causes the actuator member 102 to displace the throttle plate 16 at such a rate and over limited excursions that "smoothing governing", as will be described subsequently, is achieved. This reference point governing mode continues until the engine speed falls below the drop-out value, as previously described, such as would occur when the driver shifts the vehicle into gear.

Operation of the governor in the engine governing mode is most likely to occur when the vehicle is being accelerated in low gear; for example, the driver may be accelerating with the throttle fully depressed and either the precall may be activated or the engine speed may exceed the governed value. Thus, the actuator member 102 moves at full speed from the wot-1 position to the reference point. In the reference point governing mode, the motor 62 is energized for operation at the "engine governing mode slow speed", as defined above. This slow speed of motor operation causes the actuator member 102 to displace the throttle plate 16 at such a rate and over such limited excursions that "smooth governing", as will be described subsequently, is achieved. This reference point governing mode continues until the engine speed falls below the drop-out value, as previously described, such as would occur when the driver shifts the vehicle to the next gear.

The governor is operated in the road speed governing mode, as described above, when the vehicle is being driven with the transmission in high gear at highway speed. The driver may accelerate to the governed speed by depressing the accelerator pedal, in some cases by depressing it to the floor. In this operating condition, when the road speed exceeds the call-in speed the motor 62 is energized at full speed to move the actuator 102 to the reference point. This places the governor in the reference point modulation mode. In this mode, the motor may be operated at any one of the four different slow speeds, namely deadband slow speed, band #1 slow speed, band #2 slow speed, and band #3 slow speed, as defined above. The selected slow speed will be that corresponding to the speed band nearest the governed speed in which the measured road speed falls. Thus, if the measured road speed falls within the deadband, the motor is operated at the deadband low speed. If the measured speed falls outside the deadband but within band #1, the motor is operated at band #1 slow speed, and so on for the other speed bands. These motor speeds are of such value that the reference point governing mode produces "smooth governing" as defined below. The reference point governing mode continues until the road speed decreases below the drop-out value which may occur by reason of the driver letting up on the accelerator pedal or by any combination of driving conditions such as a steep grade or a strong headwind.

The term "smooth governing" as used herein, means that the engine speed or road speed, as the case may be, is brought to a certain degree of steady state operation at the governed value by alternate excursions of overshoot and droop in excursions of small magnitude and of short time duration. In particular, the first overshoot does not exceed 3 percent of the governed speed and the time duration is less than 3 seconds. The following droop does not exceed 1 per cent of the governed speed and the time duration is less than 2 seconds. Subsequent to the droop, the speed excursions from the governed value do not exceed 0.7 per cent of the governed value. It is assumed, for purposes of determining this governing action, that the driver's control and the vehicle operating conditions remain unchanged. This smooth governing is achieved by the slow speed motor operation in the reference point governing mode. In particular, the motor, and hence the actuator member, is operated at speeds sufficiently slow so that the change of throttle effect does not get ahead of the change in engine speed, i.e. the movement of the throttle never exceeds that required to take the engine or road speed to the governed value within the limits of overshoot defined above. As used herein, the term "slow speed" means a speed slow enough that the overriding throttle limiting means will move from its position at the time of speed measurement to a new position in a time interval at least as great as that required for the measured speed to change from its value corresponding to the position of the overriding throttle limiting means at the time of speed measurement to a new value corresponding to said new position of the overriding throttle limiting means.

This is accomplished by movement of the throttle plate at the following rates:

Neutral governing mode slow speed: 0.093 radians in 12 seconds (0.00775 radians per second) which is 0.56% of total travel per second.

Engine speed governing mode slow speed: 0.093 radians in 28 seconds (0.033 radians per second) which is 2.39% of total travel per second.

Road speed governing mode:
Deadband: No movement.
Band #1: 0.093 radians in 0.8 seconds (0.116 radians per second) which is 8.4% of total travel per second.
Band #2: Same as Band #1.
Band #3: 0.093 radians per 0.1 seconds (0.93 radians per second) which is 67% of total travel per second.
Full speed: 0.093 radians in 0.053 seconds (1.75 radians per second) which is 126% of total travel per second.

This smooth governing has been achieved with the governor of this invention on the following vehicles: 1982 GMC model 8.2 L engine (350, 366 and 292 CID) as used on GM pickup, medium and heavy duty trucks; 1982 model Detroit Diesel/Allison on Ford trucks; 1982 model Ford (6-cylinder 300 and 460 CID, 8-cylinder, 330 and 370 CID) on Ford pickup, medium and heavy duty trucks.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. In an engine and load speed governor for an engine having a throttle movable between an open throttle position and a close throttle position for regulating the flow of fuel to the engine, said governor being of the type comprising an overriding throttle closing means, a control means including actuating means for moving said throttle closing means to a position for limiting the engine and load speeds to predetermined governed values, the improvement wherein said control means comprises:

an electronic control circuit including a microprocessor with a programmable memory and a stored program for program control of the microprocessor, an engine speed signal generating means for producing an electrical signal corresponding to engine speed, a load speed signal generating means for producing an electrical signal corresponding to load speed, said actuating means including a reversible electric motor coupled with the overriding throttle closing means, said memory being preprogrammed to store an engine speed governed value and a load speed governed value, said microprocessor being operative under program control for determining speed values from the engine speed signal and the load speed signal and for determining whether one of said speed values is greater or less than the respective governed values, a motor driver circuit for energizing said reversible motor and having a first control signal input for energizing the motor in one direction and a second control signal input for energizing the motor in the other direction, said microprocessor being operative under program control to produce a wide open throttle signal on a first output and a close throttle control signal on a second output for controlling energization of the motor in the wide open throttle direction and the close throttle direction respectively, said first and second outputs of the microprocessor being connected respectively with the first and second inputs of the motor driver circuit, said microprocesor being operative under program control to produce each of said wide open throttle and close throttle control signals by time modulation of a DC voltage at a predetermined rate to control the energization of the motor for operation at a predetermined slow speed.

2. The invention as defined in claim 1 wherein said time modulation is pulse rate modulation.

3. The invention as defined in claim 1 wherein,
   said memory is preprogrammed to store an engine speed call-in value which is less than the engine speed governed value and a load speed call-in value which is less than the load speed call-in value,
   means for producing a reference position signal when the overriding throttle limiting means reaches a reference position between the wide open throttle position and the close throttle position,
   said microprocessor being operative under program control, when said one of said speed values exceeds its call-in value, to produce an unmodulated close throttle control signal to control the energization of the motor for operation at a predetermined full speed in the close throttle direction and to deenergize the motor in response to said reference position signal to stop the overriding throttle limiting means at said reference position.

4. The invention as defined in claim 3 wherein,
   said memory is programmed to store an engine idle speed corresponding to the lowest engine operating speed,
   said mircroprocessor being operative under program control, when the engine speed is less than the engine idle speed and when the load speed is equal to zero, for producing an unmodulated close throttle signal on said second output for moving said overriding throttle limiting means in the close throttle direction at full speed, means for producing an intermediate position signal when said overriding throttle limiting means reaches an intermediate position between the wide open throttle and the reference positions, said microprocessor being operative under program control in response to said intermediate position signal to deenergizing said motor for stopping the overriding throttle limiting means at said intermediate position.

5. The invention as defined in claim 1 wherein, said memory is preprogrammed to store an engine speed drop-out value which is less than said engine speed call-in value and to store load speed drop-out value which is less than said load speed call-in value, said microprocessor is operative under program control when said one of said pseed values is less than the respective drop-out value, to produce an unmodulated wide open throttle signal to energize the motor at full speed in the wide open throttle direction, and means for producing a wide open throttle position signal when said overriding throttle control means reaches the wide open throttle position, and means responsive to the wide open throttle position signal for stopping said motor.

6. The invention as defined in claim 3 wherein, said microprocessor is operative under program control, when the load speed is greater than the call-in value for producing a plurality of different wide open throttle signals and a plurality of different close throttle signals for motor operation at corresponding plurality of different slow speeds, the wide open throttle signal having a different pulse time modulation for each different value of slow speed and the close throttle signal having a different pulse time modulation for each different value of slow speed, said different slow speed signals being selectively produced in accordance with the deviation of the load speed signal from the governed speed.

7. The invention as defined in claim 3 including, a supply voltage source for energizing said motor under the control of said wide open throttle signal and said close throttle signal, said voltage source having a voltage which is about 1.5 times the rated voltage of said motor whereby operation of said motor at full speed by an unmodulated signal produces a motor speed greater than its rated speed.

8. The invention as defined in claim 1 wherein, the close throttle signal and the wide open signals are modulated at different rates to compensate for the spring force acting in the close throttle direction so that the motor speed is substantially the same in both the close throttle and wide open throttle directions.

9. The invention as defined in claim 1 including, a pair of logic gates, said first output of the microprocessor being connected through one of said logic gates to said first input of the motor driver circuit and the second output of the microprocessor being connected through the other logic gate with the second input of the motor driver circuit, said logic gates being cross coupled between the output of one and the input of the other whereby the outputs of the logic gates are prevented from being in the same logic state.

10. The invention as defined in claim 1 including, a logic gate having a first input connected with said engine speed generator and a second input connected with said load speed signal generator, the output being connected with the interrupt input of the microprocessor, a second input of the microprocessor being connected with one of the speed signal generators for distinguishing the one speed signal from another at the interrupt input.

* * * * *